J. Y. CLACK.
WAGON BRAKE.
APPLICATION FILED MAR. 27, 1911.
1,012,985.
Patented Dec. 26, 1911.
2 SHEETS—SHEET 1.
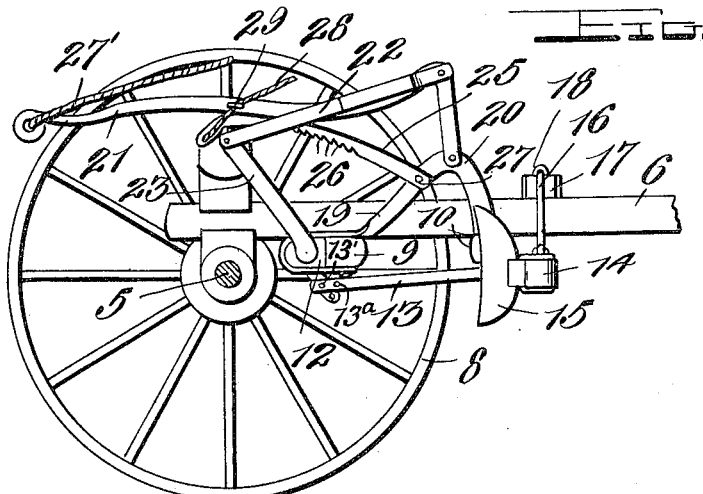
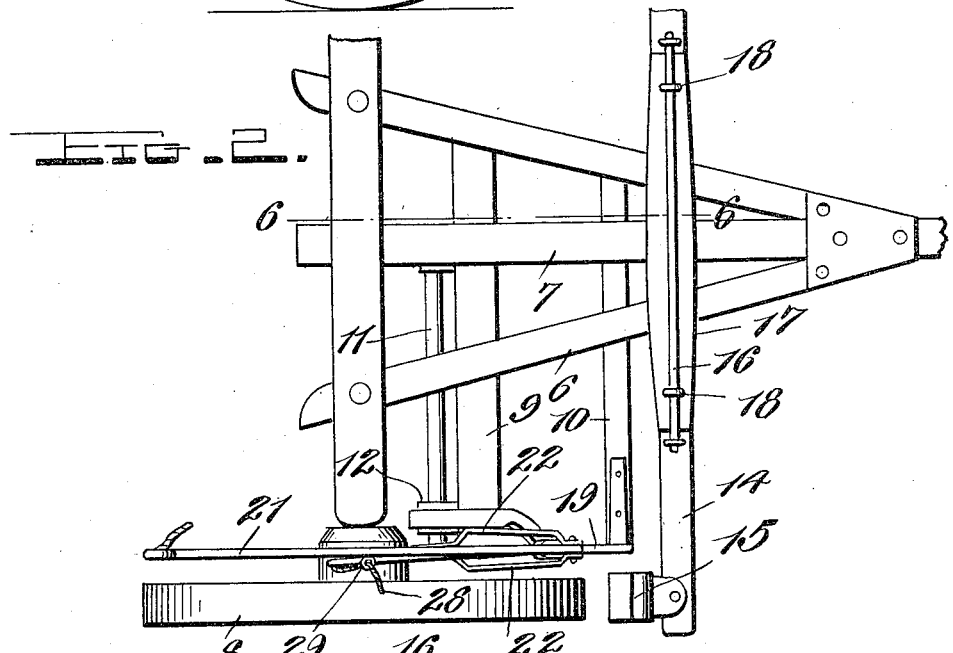
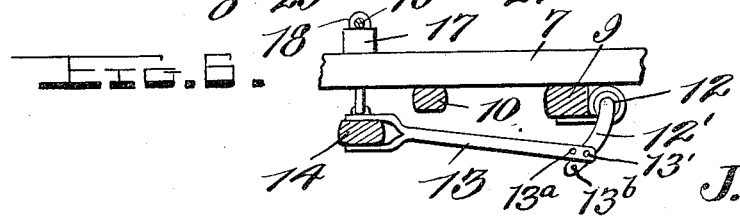
Inventor
J. Y. Clack,
Witnesses
Chas. L. Griesbauer.
L. H. Ellis.
By Watson E. Coleman,
Attorney

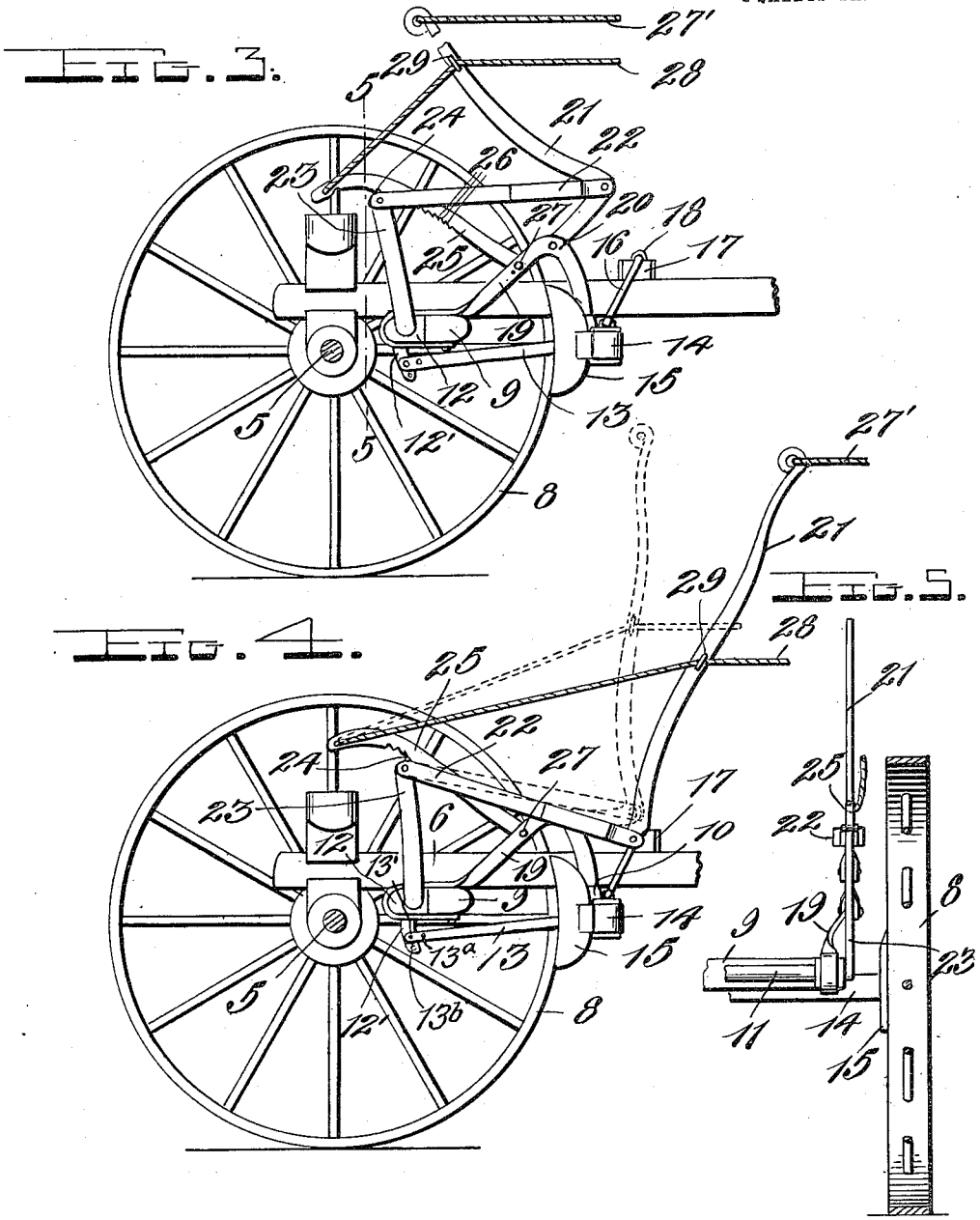

UNITED STATES PATENT OFFICE.

JOHN Y. CLACK, OF RED BAY, ALABAMA.

WAGON-BRAKE.

1,012,985.  Specification of Letters Patent.  Patented Dec. 26, 1911.

Application filed March 27, 1911. Serial No. 617,101.

*To all whom it may concern:*

Be it known that I, JOHN Y. CLACK, a citizen of the United States, residing at Red Bay, in the county of Franklin and State of Alabama, have invented certain new and useful Improvements in Wagon-Brakes, of which the following is a specification, reference being had to the accompanying drawings.

This invention relates to certain new and useful improvements in wagon brakes and has for its primary object to provide a simple and effective device of this character whereby the pressure of the brake shoes upon the peripheries of the vehicle wheels may be varied in accordance with the steepness of the grade or as necessity may require.

Another object of the invention is to provide means for quickly operating the brake to engage the brake shoes with the vehicle wheels and to absolutely lock the wheels against rotation on the vehicle axle.

Still another object of the invention resides in the provision of an efficient and durable brake which may be applied to heavy truck wagons as well as lighter vehicles, and can be manufactured at comparatively small cost.

With the above and other objects in view, the invention consists of the novel features of construction, combination and arrangement of parts hereinafter fully described and claimed, and illustrated in the accompanying drawings, in which—

Figure 1 is a side elevation of one of the vehicle trucks showing my improved brake applied thereto; Fig. 2 is a top plan view thereof; Fig. 3 is a view similar to Fig. 1 showing the brake applied; Fig. 4 is a similar view showing the wheels locked; Fig. 5 is a detail section taken on the line 5—5 of Fig. 3; and Fig. 6 is a section taken on the line 6—6 of Fig. 2.

Referring in detail to the drawings 5 designates a vehicle axle, and 6 the hounds of the running gear which are arranged upon said axle and secured to the reach bar 7 in any approved or well known manner. Upon each end of the axle 5, a vehicle wheel 8 is mounted.

While I have shown my improved brake applied to the rear wheels of the vehicle, it will be obvious that the device may also be applied to the forward wheels.

To the under side of the hounds 6 the parallel transverse bars 9 and 10 are secured. A rock shaft 11 is mounted in bearings 12 arranged upon the rear bar 9. The inner end of this shaft is formed with a downwardly extending crank 12′ to which one end of a rod 13 is pivotally connected. The rod 13 is adjustably connected to the crank 12′ to regulate the pressure of the shoes 15 on the wheels by providing said rod and crank with a number of openings 13$^a$ and 13$^b$ respectively which are adapted to receive the pivot pin 13′. The forward end of this rod is bifurcated to receive the central portion of a brake beam 14 which extends beneath the forward ends of the hounds 6 and has a brake shoe 15 secured to each end thereof for engagement with the peripheries of the wheels 8. This brake beam is pivotally mounted upon the extremities of a U-shaped rod 16 which is rotatably mounted upon the transverse bar 17 rigidly secured to the hounds of the running gear, said rod being mounted in suitable bearings 18 on said bar.

A bracket 19 is rigidly secured at its ends to the transverse bars 9 and 10, one end of said bracket which is secured to the bar 9 having secured therein one of the bearings 12 for the rock shaft 11. The forward portion of the bracket 19 is vertically disposed and of substantially V-shaped form as indicated at 20. Upon the point or apex of this V-shaped portion of the bracket, the lower end of a bell crank lever 21 is pivotally mounted. Link bars 22 connect this lever to the end of a crank arm 23 which is formed on the outer end of the rock shaft 11. The end of this crank arm has a shoulder 24 formed thereon for engagement by the teeth 26 of a bar 25 which is pivotally mounted upon the bracket 19 as indicated at 27. Suitable operating cords or cables 27′ and 28 are connected to the ends of the lever 21 and the bar 25 respectively. An eye 29 is secured upon the lever 21 through which the operating cord or cable 28 extends. These operating cables are suitably arranged within convenient reach of the driver of the vehicle.

The operation of my improved brake is as follows. When it is desired to apply the brake shoes lightly to the vehicle wheels so as to check the movement of the vehicle, the operator pulls upon both of the cables 27 and 28, lifting the bell crank lever 21 until the brake shoes engage with the peripheries of the wheels. He then releases the cable 27', thus allowing the bar 25 to descend so that one of the teeth thereof engage with the shoulder 24 formed upon the crank arm 23. This arrangement of the parts is illustrated in Fig. 3 and it will be obvious that when so disposed the brake shoes are retained in contact with the wheels, and the operator may release the cords or cables. When it is desired to absolutely lock the vehicle wheels upon the axle, the operator continues to pull upon the bell crank lever until the point of pivotal connection of the links 22 to said lever is moved below the point of connection of the lever to the bracket 19. Upon releasing pull upon the cable 28, the bar 25 will again fall so that its teeth 26 will engage the shoulder on the arm 23 and securely lock the brake shoes upon the wheels. After the operator has pulled the bell crank lever forward as far as possible, he then lifts the same slightly to the position shown in dotted lines in Fig. 4 which engages the shoulder on the end of the crank arm 23 with one of the teeth of the rack bar 25. It will be observed that when in this position, the pivotal connections of the links 22 with the lever 21 are substantially in alinement with the pivotal connection of the lower end of said lever to the bracket 19. Thus as soon as the operator pulls the cord 28, the lever will be thrown into the position shown in Fig. 1 and the brake shoes moved out of engagement with the wheels.

From the foregoing it is thought that the construction and operation of my invention will be readily understood.

The device may be very quickly operated to apply the brakes and also instantly released when desired. By providing a lock for the brake mechanism in the various positions the pressure of the brake shoes upon the wheels may be conveniently regulated as necessity may require. My improved brake mechanism is also very simple in construction and highly durable and efficient in practical use and may be manufactured and applied to the vehicle at comparatively small cost.

While I have shown and described the preferred construction and arrangement of the various parts, it will be understood that the device is susceptible of considerable modification without departing from the essential feature or sacrificing any of the advantages thereof.

Having thus described the invention what is claimed is:—

1. In a vehicle brake, the combination with a movable brake beam having a brake shoe on each end thereof, of a rock shaft having a crank formed on one end, a connection between said shaft and the brake beam, a pivotally mounted bell crank lever, the pivotal point of said lever being disposed above the plane of said shaft, a link bar connecting the crank of the shaft and said lever, said lever being movable to dispose the pivotal connection of the link thereto below the pivotal point of the lever to apply excessive braking pressure upon the vehicle wheels, an independently movable gravity locking bar co-acting with the link of said shaft to lock said shaft against rotative movement, and operating elements connected to said bell crank lever and to the locking bar.

2. In a vehicle brake, the combination with a movably mounted brake beam having a brake shoe on each end thereof, of a rock shaft having a crank formed on each end, a rod connecting one of said cranks and the brake beam, a pivotally mounted bell crank lever, links connecting said bell crank lever to the other crank of said shaft, said lever being movable to dispose the point of pivotal connection of the links thereto below the pivotal point of said lever to engage the brake shoes with the vehicle wheels and lock said wheels, and an independently movable locking bar disposed between said links for engagement with the crank of said shaft to prevent the release of the brake.

In testimony whereof I hereunto affix my signature in the presence of two witnesses.

JOHN Y. CLACK.

Witnesses:
W. R. KING,
J. A. HUDSON.

Copies of this patent may be obtained for five cents each, by addressing the "Commissioner of Patents, Washington, D. C."